April 29, 1947.  R. A. WEINHARDT ET AL  2,419,749
ELECTROPERCUSSIVE WELDING APPARATUS
Original Filed Aug. 26, 1939
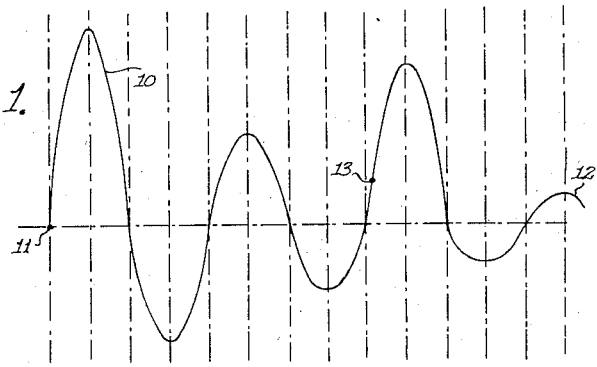
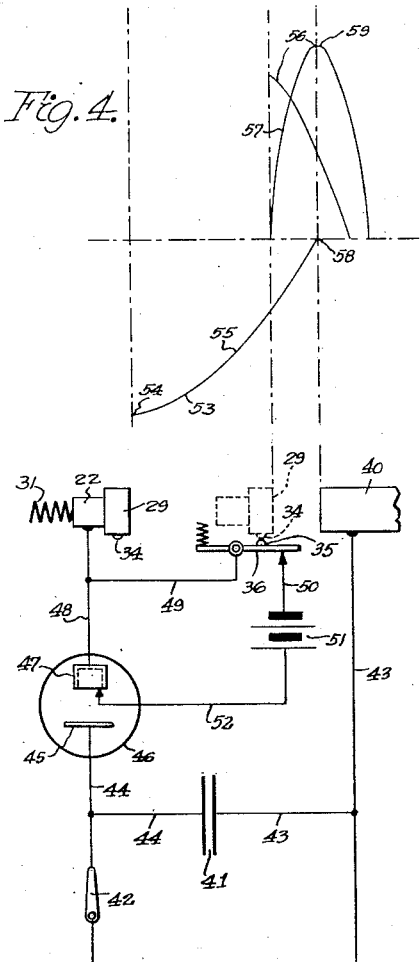
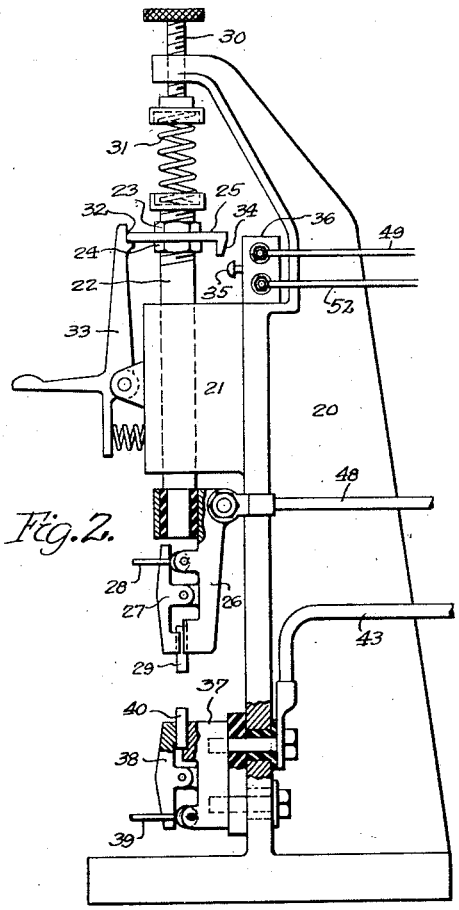
Inventors
Howard J Bowman, and
Robert A. Weinhardt Patented Apr. 29, 1947

2,419,749

UNITED STATES PATENT OFFICE 2,419,749

ELECTROPERCUSSIVE WELDING APPARATUS

Robert A. Weinhardt, Detroit, Mich., and Howard J. Bowman, East Troy, Wis.

Continuation of application Serial No. 292,120, August 26, 1939. This application August 30, 1944, Serial No. 551,812

9 Claims. (Cl. 219—4)

This invention relates to a new method and improved apparatus for welding. This application is a continuation of co-pending application Serial No. 292,120 filed August 26, 1939, in the names of Theodor Barthold Kohler, Robert A. Weinhardt, and Howard J. Bowman, as joint inventors.

Methods of and apparatus for welding work pieces together have substantially universally employed, to date, currents of bi-directional or oscillatory characteristics through the use of devices, such as condensers, transformers and the like. The caliber or quality of the welds has ranged between limits of satisfaction and acceptability, but even the best weld and its method of and apparatus for producing it have not approached, in efficiency and perfection, the weld made possible by the herein disclosure.

The imperfection of the heretofore known weld has been due largely to two factors, namely, the sole reliance upon the bi-directional or oscillatory type of current, and the utter inability to control the discharge thereof in making the weld. The effects of these factors are described below and precede the description of the measures taken to correct them, principally because this order of procedure will amplify the reasons for correction and simplify the understanding of how they have been met and overcome.

The current discharge from a condenser is rapid, of course, and of decreasing amplitude, the greatest amplitude being that at the peak of the first half-cycle or pulsation and, therefore, representative of the greatest current value reached by the discharging current. So, to obtain the most efficient weld, that is, a weld produced by utilizing exclusively that portion of the current represented by the first quarter of the first cycle of the flow thereof, it would be necessary to provide a gap between the work pieces across which the spark would jump to complete the circuit and which gap would be closed simultaneously with the instantaneous existence of the aforementioned peak current. In practice, however, this has not been possible. The condenser, uncontrolled, has discharged when the gap between the work pieces has been such as to permit the discharge, and it has not been possible, regardless of what the mass of the moving work piece and its support has been, to close the gap by the time the first quarter-cycle of the current flow has been completed.

Resulting from the previous inabilities to control the condenser and close the gap between the work pieces within the proper time, the current employed for the actual weld has always been less than its maximum value and its discharge extended over a period of more than one cycle. This means that the work pieces have never been properly prepared for welding nor properly welded because the maximum available heat energy from the current has never been utilized. It also means that the portions of the work pieces adjacent the weld have been oxidized and discolored because the pieces have been alternately heated and cooled due to the plurality of current cycles to which they have been subjected during a single weld and have been exposed to the effect of the surrounding air and foreign matter upon or during each cycle alteration. It means further that each act of welding has been accompanied by extremely loud reports which have occurred during the dissipation of energy between the gap before the work pieces have been brought into engagement and have been due, it is believed, to the rushing of air into or out of said gap.

Since the art of welding at present known is not benefitted by the maximum current values it has at its disposal, it is obviously carried on with low efficiencies. Attempts have been made to increase the velocities of the approaching work pieces to cope with the unbelievable rapidity of current travel so as to bring the pieces into engagement as early after the initiation of current flow as possible, but naturally the uncontrolled condenser defeated these attempts, the results being seriously damaging. In the first place, the shock of contact, together with the effect upon the work pieces of the preceding and unnecessary current oscillations or portions thereof, distort the pieces, produce waste in the form of flash and necessitate the extremely expensive removal of said flash and the correction of said distortion. In the second place, the shock, together, it is thought, with the mechanical effect upon the work pieces of the gap conditions existing prior to, during and subsequent to each spark formation, tend toward the disalignment of the pieces and render it necessary to correct for this also.

The current discharge of a condenser is not only oscillatory but its peak values rapidly decrease in amplitude during such discharge. Each peak value represents the time when the spark created thereby in the gap between the work pieces is at its greatest intensity and greatest diameter or has its greatest area. The diameter or area of the spark, because of its instantaneous existence, determines the heating effect upon the pieces and the diameter or area of the weld possible to be produced thereby. Therefore, since it has been customary, due to the physical inability to do or be otherwise, to forsake the earliest cycles of the discharge and even to forsake the peak value of a subsequent cycle, severe limitations have been placed upon the adaptability of former welding processes and apparatus. In many instances it has been impossible to weld work pieces together because of their relative or even similar hardness; in others the elemental natures of the metals have presented difficulties; coated metals have had to be cleaned of such coatings. In all instances the loss of energy due to its wasted dissipation prior to engagement of the work pieces has been enormous.

In view of the previously outlined disadvantages of and objections with presently known welding methods and apparatus, one of the objects of this invention is to provide a new and improved apparatus for welding which obviates such disadvantages and objections and enables welding to be performed more efficiently and with better results than heretofore.

Another object is to provide a new and improved welding apparatus therefor in which the discharge of the welding current through the work pieces to be welded is controlled so as to enable a selective and most advantageous utility thereof.

Another object is to widen the scope of heretofore limited weldability of welding apparatus so that materials within a greater selection of hardness, elemental nature and character can be readily, substantially effortlessly and more efficiently joined together.

Another object is to provide a new and improved welding apparatus whereby flash formation, discoloration, distortion and other such previously indispensable and objectionable features have been done away with.

Another object is to provide a new and improved apparatus for welding wherein the noise heretofore accompanying the act of welding has been substantially eliminated.

Another object is to provide a new and improved apparatus for welding wherein electrical losses have been minimized.

Another object is to provide a new and improved apparatus for welding wherein the work pieces and the current employed for welding same together are so correlated as to enable the utility of the most favorable portion of the current flow for preparing the pieces for welding and for performing the actual weld thereof and to obtain a weld of full coverage over the entire areas of the surfaces welded.

Another object is to provide a new and improved apparatus for welding wherein the initiation of current flow through the work pieces is selectively controlled so that the weld is completed substantially by the time the current has reached its maximum intensity.

Another object is to provide a new and improved welding apparatus wherein the welding current comprises a rectified alternating current and wherein the discharge of said current is controlled so as to be initiated upon the formation of a gap of such minute length that said gap can be closed during the dissipation of the energy represented by substantially the first quarter of the first cycle of said discharge.

Other objects and advantages of the invention will become readily apparent from a reference to the following specification taken in conjunction with the accompanying sheet of drawings wherein:

Figure 1 is a curve representing the current characteristics during the discharge of an uncontrolled condenser;

Fig. 2 is an elevational view of a welding machine with which are employed the elements of the invention;

Fig. 3 is a wiring diagram for the elements; and

Fig. 4 is a set of curves representing current and voltage characteristics during the energization of the circuit containing said elements.

In Fig. 1, there is shown a curve 10 which illustrates the current flow during the discharge of the condenser (not shown) of an ordinary electrical welding apparatus, the point 11 of said curve representing the beginning of said discharge, or the time when the work pieces to be welded together are so spaced as to permit a spark to jump thereacross and close the circuit, and the point 12 (for thereabout) of said curve representing the end of said discharge. In view of the oscillatory nature of the current, the past inability to control its flow from the condenser except at the time when the gap between the work pieces is such as to permit the closing of the circuit, and the physical inability to close the gap within the necessary short time so as to utilize the current when at its maximum intensity, there is a point on the curve 10, such as at 13, when the gap is closed, and it will be noted that this point occurs subsequent to the earliest cycle of current flow and, which is more than likely, in offset relationship to the peak of the cycle in which it occurs. As has previously been pointed out, the closing of the gap between the work pieces at 13 is coupled with inefficiency and otherwise faulty features, and it is the correction thereof to which the invention is directed.

In Fig. 2, there is shown a machine the function of which is to support the work pieces for relative movement so that a selectively predetermined gap therebetween may be formed and the welding circuit simultaneously closed, whereafter said gap is also closed, and for this reason the machine that is so shown is purely illustrative of a machine which is capable of performing such function and is, therefore, modifiable at will without departing from the scope of the true invention. With this in mind, the machine includes an upright or standard 20 which is formed with a boss or guide 21 for reciprocably supporting a plunger or carrier 22. The carrier 22 is threaded at its upper end for adjustably receiving a pair of nuts 23 and 24 between which is fixed by the tightening thereof a plate or arm 25, the level of the latter being adjustable, of course, by and in accordance with the adjustment of said nuts with respect to said carrier. The lower end of the carrier 22 is provided with means, such as clamping jaws 26 and 27 preferably cooperable by means, such as a pivoted, eccentric lever 28, by which a work piece 29, connected, as will be seen, in the positive side of the circuit, may be rigidly held for movement with said carrier. Obviously, the means for holding the work piece 29 are purely illustrative and subject to contemplated modification.

The standard 20 supports a head member 30 which is adjustably movable toward and from the upper end of the carrier 22, and between said member and said carrier there is supported a spring 31 or other compressible means by which upward movement of said carrier relatively to said member and said standard is opposed and downward movement urged. For holding the carrier 22 in a predetermined raised position against the force of the spring 31, there is provided a catch 32 formed on a trip 33 pivotally carried by the stationary boss or guide 21, said catch being engageable with one side of the plate or arm 25 for maintaining said carrier in said raised position and being disengageable therefrom for permitting downward travel of said carrier under the force of said spring. Obviously, the means for holding the carrier 22 in a raised position and for selectively permitting its downward travel are purely illustrative and subject to contemplated modification. The means for raising the carrier 22 into the position thereof shown in Fig. 2 may be of any desired form.

The adjustable plate or arm 25 has a portion 34 which, at some predetermined instant during the descent of the carrier 22, engages and depresses a switch button 35 of a switch 36 carried on the standard 20, and which engagement, as will subsequently be seen, exclusively determines the closing of the welding circuit. The adjustability of the plate or arm 25 permits, therefore, the closing of the welding circuit at any selected position of the work piece 29 with respect to its complementary work piece which is to be discussed presently. It will be noted, especially in Fig. 2, that the arm portion 34 is elongated in the direction of travel of the movable work piece 29 for keeping the switch 36 closed for a substantial period after the closing thereof by the initial inter-engagement of said arm portion and the button 35. Though the switch 36 may be any type desired, it is preferable, for reasons which will presently appear, to employ one of fast acting characteristics so as to be closable without lag or sluggishness.

The lower end of the standard 20 is provided with clamping jaws 37 and 38 cooperable by means, such as a pivoted, eccentric lever 39 similar to the lever 28, for rigidly holding, in alignment with the work piece 29, a work piece 40 connected, as will be seen, in the negative side of the welding circuit. Obviously, the means for holding the work piece 40 are purely illustrative and subject to contemplated modification. However, since there must be a single path for the welding current to pass through the work pieces 29 and 40, it is to be understood that proper insulation will be provided between the means carrying said work pieces and the means carrying said first means, the need for such provision being common knowledge and not necessitating further discussion.

Looking for the present at the diagram in Fig. 3, a condenser 41 is shown and is connectible across a direct current line voltage or other energy source for being charged to the desired degree, such being common practice and well known so will not be further discussed, and, after the charging of said condenser, it is removed from said source by means, such as a switch 42. The negative side of the charged condenser 41 is connected, by means of a lead 43, to the negative and stationary work piece 40, and the positive side of said condenser is connected, by means of a lead 44, to the anode 45 of a rectifier 46, said rectifier being of any type desired and which will handle the necessarily high current surges discharged from said condenser and restrict the passage of current therethrough to one of uni-directional characteristics.

It has been found that a rectifier of the ignitron type is very desirable, but the invention, it is to be understood, is not to be limited to the use thereof, for any rectifier, switch or switches which can control the initiation of current discharge from the condenser 41 and permit only a uni-directional current to flow through the work pieces 29 and 40 is suitable. The cathode 47 of the rectifier 46 is connected to the positive work piece 29 by means of a lead 48.

The movable contact of the switch 36, which switch is normally open but which is closed by the depression of said contact caused by the engagement of its button 35 with the portion 34 of the movable plate or arm 25, is connected, by means of a lead 49, to the lead 48 between the rectifier cathode 47 and the movable, positive work piece 29, and the stationary contact of said switch, which is engaged by said movable contact solely upon the depression of the latter, is connected, by means of a lead 50, to one side of a battery 51 or other independent current source. The other side of the current source 51 has connected thereto a lead 52, said lead being associated in the usual and well known manner with the cathode 47 of the rectifier 46 so that the closing of the switch 36 causes energy to flow from said source 51 into said cathode whereupon the resulting ionization within said rectifier causes the initiation of current flow from the condenser 41 into said rectifier, the latter thereupon rectifying said condenser current and restricting the flow therefrom to the work pieces 29 and 40 to one of unidirectional characteristics.

The curve 53 in Fig. 4 represents the descent of the carrier 22, the point 54 representing the position thereof as shown in Fig. 2, and the point 55 representing the position thereof upon the closing of the switch 36. With the various mechanical and electrical constants and characteristics known or capable of ascertainment, it is possible to adjust the closing of the switch 36 at a time so that the closing of the gap between the work pieces thereafter will be effectuated positively by substantially the time the first quarter cycle of rectified current has flowed. The results of such procedure are recorded in the voltage and current curves 56 and 57 in Fig. 4, the voltage beginning to fall when point 55 is reached, and the current beginning to rise simultaneously. When the point 58 on the curve 53 is reached, which represents the time when the work pieces are in actual engagement with each other, the peak point 59 on the current curve 57 will have been reached and only a quarter cycle of current will have flowed. It is obvious, then, that the current employed during the closing of the gap is the rising current from zero to maximum and is so employed for molecularly preparing the pieces for welding, and that the current employed at the instant said gap is closed is at its maximum intensity and is so employed for making the actual weld. Since the only rectified current cycle of interest herein is the first one, the curve 57 shows only that cycle, but it is to be understood that others follow, as is characteristic of a discharging condenser, and that the current represented thereby merely passes through the then closed circuit which includes the welded unit, doing neither harm nor good to said unit but merely giving rise to the necessity for re-charging the condenser for the next welding operation.

By controlling the condenser discharge, as described, so as to employ substantially exclusively that portion of the current flowing from zero to its peak 59, all of the objections previously outlined and relating to past and present welding methods and apparatus have been alleviated and high efficiencies introduced. Thunderous reports and resulting energy losses usually accompanying welding operations have been eliminated because the preparation of the metals prior to engagement and the actual welding thereof at engagement are carried on in a substantial absence of air and with maximum efficiency, the rising current and its accompanying spark formation and growth to maximum intensity, diameter and/or area driving all the air from the gap and none being permitted to re-enter because of the closing of the gap at the peak 59. This closing of the gap at the peak 59 permits a weld of full coverage over the opposing surfaces of the work pieces because, as has been said, the spark at that time is at its greatest intensity, diameter and/or area. Discoloration of the surfaces adjacent the weld by oxidation has been eliminated because only the rising current is now employed, whereas, in the past, the work pieces have been alternately heated and cooled upon and during each cycle alteration. Employing only that current flowing between zero and the peak 59 for preparing the work pieces for welding, and then actually welding at the peak, have done away with those parasitic oscillations which have, in the past, over-prepared the metals and lost their effectiveness by the time the metals have been actually brought together, the present weld thereby being far more efficiently produced and having far better adhesive or cohesive qualities. Distortion of the metals has been eliminated and the saving of metal, by minimizing flash, has been effectuated, because only that current and that force of contact necessary for the perfect weld are now employed. Even the heat losses in the leads have been minimized because only a single pulsation or portion thereof flows through them.

The control of the condenser discharge to employ the proper portion of the current at the proper time enables the welding together of metals which never before, because of their hardness and/or dissimilar elemental characteristics, areas and fusion temperatures, could be welded together. Even metals which are coated with dirt, grease, rust or other foreign matter, or which are even painted or coated with other such non-metallic coverings, can now be welded together. It eliminates the need for any preparation of the metals prior to their being welded together other than the resort to the current itself. And, the rectification of the current, together with the control of the condenser discharge, may serve, if desired, the purpose of plating one work piece with metal from the other work piece, in lieu of the welding thereof.

Although the invention has been described with some detail it is not intended that such description is to be definitive of the limits of the inventive idea. The right is reserved to make such changes in the details of construction and arrangement of parts as will fall within the purview of the attached claims.

What we claim is:

1. In an apparatus for inter-welding work means and having means for moving the work means toward each other, means in circuit with the work means and providing a supply of welding energy, means in circuit with the work means and said energy supply means for withholding energy flow through said circuit until a predetermined spacing between the work means is effected, and means associated with said energy withholding means and operable responsive to the attainment of said spacing for initiating said energy flow, the length of said spacing being such as to have a zero value upon the attainment by the energy of substantially its maximum value.

2. In an apparatus for inter-welding work means and having means for moving the work means toward each other, means in circuit with the work means and providing a supply of welding energy, a control arranged in said circuit and operable for preventing energy flow from said energy supply means until the attainment by the work means of a predetermined spacing therebetween, and a second control arranged in said circuit and operable responsive to the attainment by the work means of said inter-spacing for ineffectuating the flow preventive action of said first control to permit energy to flow through said circuit, the length of said spacing being such as to have a zero value upon the attainment by the energy of substantially its maximum value.

3. In an apparatus for inter-welding work means and having means for moving the work means toward each other, means in circuit with the work means and providing a supply of welding energy, means in circuit with the work means and said energy supply means for preventing energy flow through said circuit regardless of the spacing between the work means, and means operable responsive to the attainment by the work means of a predetermined inter-spacing for removing from said circuit the flow preventive effect of said flow preventing means to initiate energy flow through said circuit, said second means and said fifth means cooperating to cause the simultaneous occurrence of the reduction of said inter-spacing to zero and the attainment by said energy of substantially its maximum value.

4. In combination with a device for moving the work faces of work means into engagement with each other, means including a pre-charged condenser and a rectifier in the discharge circuit thereof for providing a source of electrical energy of unidirectional characteristics, and means operable in accordance with the arrival of the work faces at a predetermined position prior to their engagement for initiating the flow of the current across the faces and correlating the time of their engagement with the time at which the current intensity is substantially maximum.

5. In combination with a device for moving the work faces of work means into engagement with each other, means providing a source of bi-directional current, means operable exclusively upon the arrival of the work faces at a position of predetermined, spaced relationship for initiating current flow thereacross and rectifying same uni-directionally, and means for effectuating the operation of said flow initiating and rectifying means exclusively at a time which correlates the time interval between said spacing and the inter-engagement of the work faces with the time interval required for the rise in value of the rectified current from zero to substantially its maximum.

6. In combination with a device for moving a pair of work pieces into engagement with each other, means providing a source of electrical current of uni-directional characteristics, and means operable in accordance with the arrival of the work pieces at a predetermined position prior to their engagement for initiating the flow of the current through the work pieces and correlating the time of their engagement with the time at which the current intensity is substantially maximum.

7. In combination with a device for moving a pair of work pieces into engagement with each other, means providing a source of bi-directional current, means operable upon the arrival of the work pieces at a position of predetermined, spaced relationship thereof for rectifying the current and initiating a flow thereof of uni-directional characteristics through the work pieces, and means for effectuating the operation of said second means at a time which correlates the time interval between said spacing and said engagement of the work pieces with the time interval required for the rise in value of the latter current from zero to substantially its maximum.

8. In combination with a device for moving a pair of work pieces into engagement with each other for being welded together, a pre-charged condenser connected within a normally open circuit including the work pieces, a rectifier in series with the work pieces and said condenser, and means operable in accordance with the acquisition of a gap of predetermined length between the work pieces for closing said circuit, said length being such as to have a zero value upon the attainment by the current in said circuit of substantially its maximum value.

9. In combination with a device for moving the work faces of work means into engagement with each other, means providing a source of welding current, means for controlling said source providing means, and means operable in accordance with the arrival of the work faces at a predetermined position prior to their engagement for inducing said controlling means to cause initiation of current flow from said source providing means across the work faces and correlate the time of their engagement with the time at which the current intensity is substantially maximum.

ROBERT A. WEINHARDT.
HOWARD J. BOWMAN.